Patented Jan. 8, 1929.

1,698,602

UNITED STATES PATENT OFFICE.

ALWIN MITTASCH AND CARL MÜLLER, OF MANNHEIM, AND LEO SCHLECHT AND WALTER SCHUBARDT, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PRODUCTION OF HYDROCARBONS.

No Drawing. Original application filed March 11, 1927, Serial No. 174,695, and in Germany March 13, 1926. Divided and this application filed February 17, 1928. Serial No. 255,183.

The subject-matter of the present application has been divided out from our copending application Ser. No. 174,695, filed March 11, 1927.

The present invention relates to the production of hydrocarbons from oxids of carbon and hydrogen.

We have found that the pure metals which are obtained from the corresponding carbonyl compounds form an excellent material, either alone or in conjunction with other substances, for use as catalysts in the production of hydrocarbons by the catalytic reduction of oxids of carbon by means of substantially less hydrogen than is theoretically necessary for converting the oxids of carbon into methane. The reaction may be carried out under ordinary, reduced or increased pressure. Since the said metals are uncontaminated by sulfur, phosphorus, silicon and the like, they furnish contact masses by means of which high yields of hydrocarbons may be obtained over a long period, provided the gases and such hot parts of the apparatus as come into contact therewith are also free from the impurities specified. For the production of the catalysts according to this invention, the original material may consist of iron or other metals in the form of fine powder, such as are obtained by decomposing metal carbonyls at comparatively low temperatures in a gaseous atmosphere, the said powder being, if necessary, melted down before use. Solid metals prepared in other ways from the corresponding carbonyls, for example directly in a fused state, may also be employed. Such fused metals usually differ from the fine powders in that they contain a smaller, and as a rule scarcely a detectable, amount of carbon.

Instead of preparing the catalysts from the metals directly obtained from the carbonyls, it is also possible to start from the pure metal oxids obtained by combustion of the carbonyls. The new catalysts may contain other constitutents or be employed on suitable supports. Especially suitable catalysts are those consisting merely of one or more metals prepared from the corresponding carbonyls. It is even possible to produce the catalyst only in the course of the reaction by passing the carbonyl vapor or vapors together with hydrogen or gases containing same through a heated reaction vessel, in which the carbonyl is decomposed to the metal acting as catalyst and carbon monoxid reacting with the hydrogen with the formation of hydrocarbons. It may also be advantageous to add other gases or vapors which exert a favorable influence on the said reaction, such as amonnia or water vapor.

The following examples will further illustrate how the said invention may be carried into practical effect, but the invention is not limited thereto.

Example 1.

A shaft furnace is filled with flakes of iron having the appearance of cotton wool which are obtained by decomposition of iron carbonyl vapor diluted with carbon monoxid in the hot free space of a heated vessel. The furnace is heated to about 250° C. whereupon a mixture of equal parts by volume of carbon monoxid and hydrogen is passed therethrough. On cooling the gases leaving the furnace, hydrocarbons which are liquid at room-temperature, are separated along with water. The said hydrocarbons may be employed in part for example as fuel or as solvents, in part as lubricating oil. When the formation of hydrocarbons diminishes, the catalyst can be removed from the furnace and fresh quantities thereof readily prepared therein by introducing iron carbonyl vapor into the reaction vessel which for this purpose is maintained at a somewhat higher temperature.

Example 2.

Iron carbonyl vapor and hydrogen in the proportion of 1 kilogramme of carbonyl to 400 litres of hydrogen are introduced into the top of a shaft furnace heated externally to about 240° C. The resulting fine iron powder is separated in dust chambers and the gas leaving said chambers is freed from the hydrocarbons contained therein by means of active silica. The hydrocarbons are expelled from the silica, for example by treatment with steam, and condensed and may be employed for example as a readily volatilizable fuel. A considerable amount of more difficultly volatile hydrocarbons can be recovered from the iron powder by heating same.

In the reaction described in the example, the nature of the resulting hydrocarbons depends on the speed of the gas current, the proportions of the ingredients, and the temperature and pressure.

The metal which has been employed as catalyst, may again be converted into the carbonyl and thus employed in a circular course, or may be utilized in any other manner.

The hydrocarbons may be separated from the gaseous reaction mixture also in any other suitable manner than indicated above, for example by means of suitable solvents, or by compression and the like.

What we claim is:

1. The process of producing hydrocarbons from a gaseous mixture containing oxids of carbon and substantially less hydrogen than is theoretically necessary for the conversion of the oxids of carbon into methane, characterized by the employment of a catalyst comprising a metal prepared from the corresponding metal carbonyl.

2. The process of producing hydrocarbons from a gaseous mixture containing oxids of carbon and substantially less hydrogen than is theoretically necessary for the conversion of the oxids of carbon into methane, characterized by the employment of a catalyst comprising a metal prepared by thermal decomposition of the corresponding metal carbonyl.

3. The process of producing hydrocarbons from a gaseous mixture containing carbon monoxid and substantially less hydrogen than is theoretically necessary for the conversion of the carbon monoxid into methane, characterized by the employment of a catalyst comprising a metal prepared by thermal decomposition of the corresponding metal carbonyl.

4. The process of producing hydrocarbons from a gaseous mixture containing carbon monoxid and substantially less hydrogen than is theoretically necessary for the conversion of the carbon monoxid into methane, characterized by mixing together a gaseous mixture containing carbon monoxid and hydrogen, and such amounts of a metal carbonyl that by thermally decomposing the metal carbonyl a gas mixture containing carbon monoxid and hydrogen in the abovementioned proportion is obtained in which the metal is suspended as catalyst, and heating the resulting mixture to effect the desired reactions.

5. The process of producing hydrocarbons from a gaseous mixture containing carbon monoxid and substantially less hydrogen than is theoretically necessary for the conversion of the carbon monoxid into methane, characterized by mixing together a gaseous mixture containing carbon monoxid and hydrogen, and such amounts of iron carbonyl that by thermally decomposing the iron carbonyl a gas mixture containing carbon monoxid and hydrogen in the abovementioned proportion is obtained in which iron is suspended as catalyst, and heating the resulting mixture to effect the desired recations.

6. The process of producing hydrocarbons from a mixture of carbon monoxid and substantially less hydrogen than is theoretically necessary for the conversion of the carbon monoxid into methane, characterized by mixing iron carbonyl with hydrogen in such proportions that by thermally decomposing the iron carbonyl a gas mixture containing carbon monoxid and hydrogen in the abovementioned proportion is obtained in which iron is suspended as catalyst, and heating the resulting mixture to effect the desired reactions.

In testimony whereof we have hereunto set our hands.

ALWIN MITTASCH.
CARL MÜLLER.
LEO SCHLECHT.
WALTER SCHUBARDT.